US009628845B2

(12) United States Patent
Beals

(10) Patent No.: US 9,628,845 B2
(45) Date of Patent: Apr. 18, 2017

(54) ASSOCIATING A CONTROL DEVICE WITH AN ELECTRONIC COMPONENT

(75) Inventor: William Michael Beals, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1320 days.

(21) Appl. No.: 12/619,591

(22) Filed: Nov. 16, 2009

(65) Prior Publication Data

US 2011/0115985 A1  May 19, 2011

(51) Int. Cl.
*H04N 5/44* (2011.01)
*H04N 21/422* (2011.01)
*H04N 21/4363* (2011.01)

(52) U.S. Cl.
CPC . *H04N 21/42204* (2013.01); *H04N 21/43635* (2013.01)

(58) Field of Classification Search
None
See application file for complete search history.

(56) References Cited

U.S. PATENT DOCUMENTS

| 7,782,407 | B2 * | 8/2010 | Hicks | 348/734 |
| 8,319,900 | B2 * | 11/2012 | Candelore et al. | 348/734 |
| 2004/0143847 | A1 * | 7/2004 | Suzuki et al. | 725/61 |
| 2004/0268391 | A1 * | 12/2004 | Clercq et al. | 725/37 |
| 2007/0124765 | A1 * | 5/2007 | Bennett et al. | 725/38 |

* cited by examiner

*Primary Examiner* — Michael Lee
*Assistant Examiner* — Omer Khalid
(74) *Attorney, Agent, or Firm* — Seed Intellectual Property Law Group LLP

(57) ABSTRACT

A method and device for associating a remote with a component. The method and system may include receiving a control command from the remote. Upon receiving the control command, an identification signal may be transmitted to a display. The identification signal may include information for identifying the component. The remote may be associated with the component based on the identification signal.

5 Claims, 4 Drawing Sheets

ASSOCIATING A CONTROL DEVICE WITH AN ELECTRONIC COMPONENT

FIELD OF THE INVENTION

Embodiments described herein generally relate to control devices and, more specifically, to a set-top box or other single electronic component that may associate a control device with an output component via an identification signal.

BACKGROUND

Many households include multiple electronic components, such as televisions, stereos and other electronic components, that may be controlled by appropriately configured remote controls. Wireless remote controls that transmit signals in the ultra-high frequency (UHF) or very-high frequency (VHF) bandwidths are capable of functioning nearly anywhere in a household, including through walls or in situations where there is no line of sight between remote and controlled component. As one example, a radio frequency television remote may be used to transmit control signals from a different room, or even a different floor, than that housing the television being controlled. In situations where multiple televisions have identical or similar corresponding remote controls, a remote control may have the tendency to be separated from its designated television.

Misplaced remotes are common in households having more than one television, and in locations having multiple televisions in the same room. The burden may then be on the user to determine which remote is associated with which component. Accordingly, there is a need in the art for an improved system and method for correlating a remote control with a respective electronic component.

SUMMARY

Generally, embodiments described herein disclose systems and methods for ensuring a remote control is associated with an set-top box. As one example, a control device (e.g., a "remote control" or simply "remote") may be reprogrammed on the fly to control a compatible set-top box. Initiating an input on the remote may transmit a pairing signal to one or more set-top boxes. Each set-top box receiving the signal may transmit a unique identifying signal to each television (or other display) associated with the set-top box. Thus, if a set-top box is connected to a first and a second television, the first television may display one identifying signal while the second television may display a second identifying signal. The identifying signal typically, although not necessarily, identifies both the set-top box and the television on which it is displayed.

The remote typically includes a sensing device that may sense any identifying signal displayed on a television in proximity to the remote. Thus, the remote may receive the identifying signal and, upon receipt, transmit the identifying signal back to the one or more set-top boxes. Each set-top box in range of the remote receives the re-transmitted identifying signal. The set-top box that corresponds to the re-transmitted identifying signal may reconfigure itself or may reconfigure the remote. Ultimately, the result of such reconfiguration is to allow the remote to operate with the set-top box and/or display that generated, and displayed, the identifying signal sensed by the remote. This process is generally referred to as "pairing" the remote with the set-top box and/or display.

It should be noted that a remote transmitting the pairing signal activates its sensing device. Other remotes, whether equipped with sensing devices or not, typically do not activate their sensing devices. Thus, the remote that initiates this pairing process typically receives an identifying signal from the nearest display device (or the one at which the remote is aimed), while other remotes do not. In this manner, the remote initiated the pairing process may have its associations updated while other remotes may not.

DETAILED DESCRIPTION OF EMBODIMENTS

I. Overview and Operating Environment

Generally, embodiments described herein disclose systems and methods for ensuring a remote control is associated with a set-top box. As one example, a control device (e.g., a "remote control" or simply "remote") may be reprogrammed on the fly to control a compatible set-top box. The set-top box may emit a signal, through an electronic component such as a television that is received and acknowledged by the remote. In response, the remote may reconfigure its output to transmit commands intelligible to the set-top box. The signal emitted by the set-top box may be optically sensed by the remote, may be a series of sounds received by the remote, or may be a signal imperceptible to a human (such as data carried on an infrared, RF or other wireless signal lacking visible light or audible noise). Thus, a user may pick up a nearby remote control and, through initiation of an association sequence, configure the remote to control a nearby set-top box and/or television whether or not the remote was originally set up to do so. The terms "electronic component" and "component" are used interchangeably herein. Both terms refer to a device that may accept commands from a remote and initiate functionality in response to that command. Accordingly, in certain embodiments devices such as televisions, audio equipment, appropriately-configured household appliances and fixtures, and so on may all be components. Further, set-top boxes themselves may be components.

Figure 1:
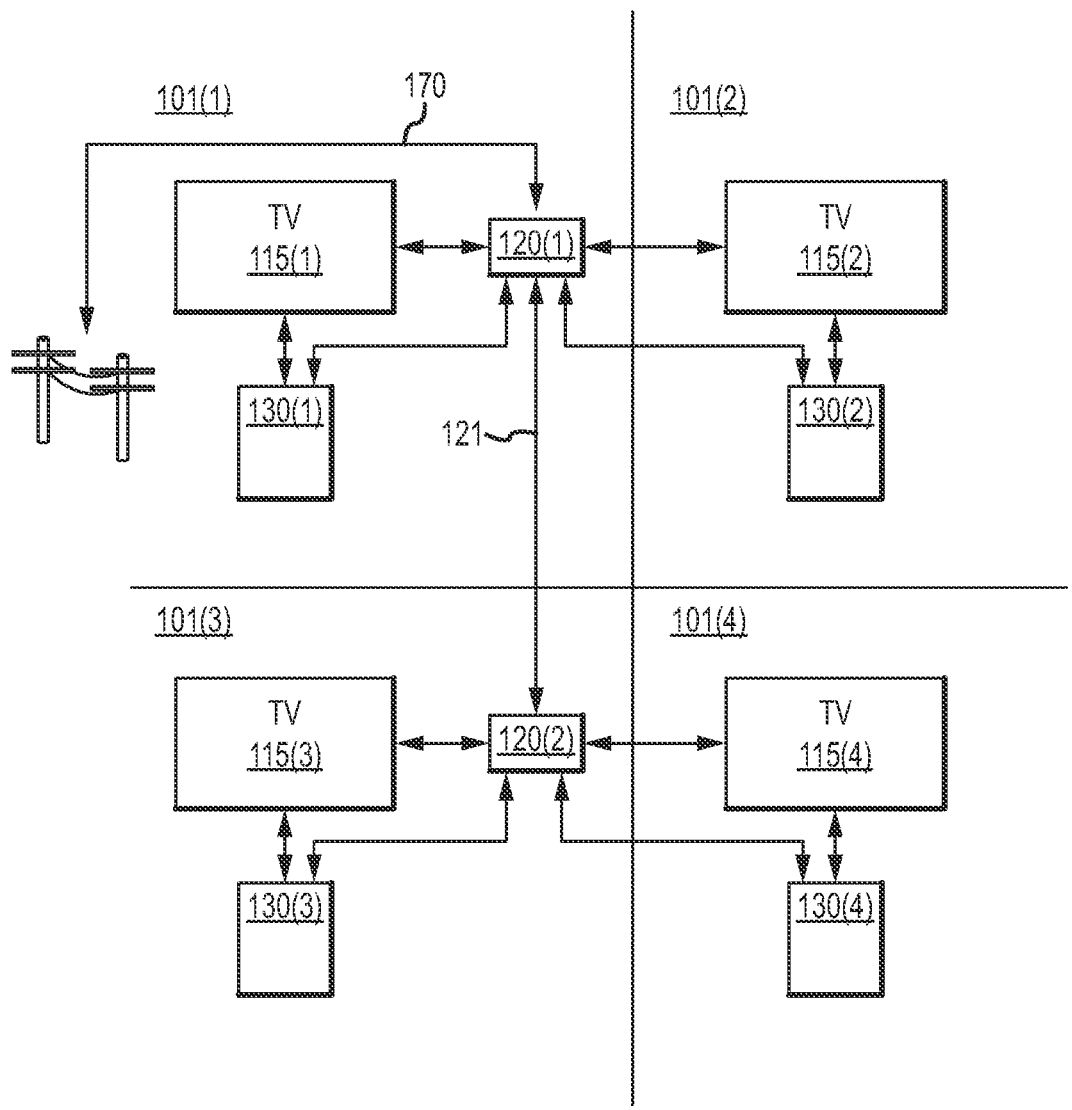
FIG. 1 depicts a sample operating environment 100 for associating a control device with a component.

FIG. 1 depicts one embodiment of an environment 100 in which a user may employ an embodiment to correlate a remote with a respective electronic component. Various components may be located in the environment 100 of FIG. 1, such as, but not limited to, one or more televisions 115(1)-115(4), one or more set-top boxes 120(1)-120(2) and one or more remotes 130(1)-130(4). The various components may be in the same room, or, as shown in FIG. 1, may be in different rooms 101(1)-101(4), or on different floors, or in different physical locations or any combination thereof.

Generally, the set-top boxes 120(1)-120(2) may receive television signals from a cable television provider, a broadcast television provider, or a satellite television provider. Each set-top box 120(1)-120(2) may process those television signals and may send the processed signals to one or more components. The set-top boxes 120(1)-120(2) may also accept control commands from multiple remotes 130(1)-130(4).

It should be noted that this document discusses functionality of embodiments with respect to "set-top boxes." A set-top box, as described herein, is intended to encompass other forms of signal receiving components, such as cable boxes, tuning circuitry within a television or receiver, and so on. Accordingly, the term "set-top box" is one of convenience and not limitation. Likewise, references to a satellite transmission system may be replaced with cable transmission systems, over the air (terrestrial) broadcasts, data transmissions across a wired or wireless network, including networks such as the Internet, intranets, and so on, without departing from the spirit or scope of this disclosure. Thus, one should understand the embodiments encompass the use of any of the foregoing networks in lieu of the satellite network used to illustrate certain embodiments herein.

The set-top boxes 120(1)-120(2) may be located in the environment 100 of FIG. 1. In addition, each set-top box 120(1)-120(2) may be connected to one or more cable television providers, antennas for receiving broadcast signals from a broadcast television provider, satellite communication components, and one or more other components, such as one or more televisions 115(1)-115(4). As shown in FIG. 1, each set-top box 120(1)-120(2) may be wirelessly or physically connected to the other set-top boxes 120(1)-120(2) in the environment, such as through a network 121. Additionally, each set-top box 120(1)-120(2) may also be connected to one or more remotes 130(1)-130(4) associated with each television 115(1)-115(4) connected to the set-top box 120(1)-120(2). In addition, a single set-top box 120(1)-120(2) may be connected to multiple televisions 115(1)-115(4) and may include multiple tuners for simultaneously processing multiple broadcast signals. Accordingly, users in a household may be able to simultaneously watch different channels on two or more televisions 115(1)-115(4) that are connected to the same set-top box 120(1)-120(2).

One or more remotes 130(1)-130(4) may also operate in the environment 100. The remotes 130(1)-130(4) may take other forms than a standard remote control, such as a cell phone, track pad incorporated into a computing system, and so on. The remotes 130(1)-130(4) may communicate with set-top boxes 120(1)-120(2) through a wired or a wireless connection. The wireless connection may be an IR signal, RF signal, wireless Internet Protocol ("IP") connection, cellular signal, WiMax signal, combinations thereof, or otherwise. The remotes 130(1)-130(4) need not be in the line of sight of a set-top box 120(1)-120(2) and, as shown in FIG. 1, may be anywhere that permits communication with the set-top box, such as in another room 101(1)-101(2) or on another floor. In addition to sending commands to a set-top box 120(1)-120(2), the remote 130(1)-130(4) may also send signals to other components that form part of the environment 100, such as a television, a stereo, a VCR, a DVD player and so on. The remote 130(1)-130(4) may include buttons, dials, or other man-machine interfaces for transmitting signals between the remotes 130(1)-130(4) and the set-top boxes 120(1)-120(2). It should also be noted that set-top boxes may communicate with one another across any appropriately configured network 121, whether wired or wireless. In some embodiments, the electrical wiring of a home or other building may serve as a network to facilitate data transmission between set-top boxes.

The remotes 130(1)-130(4) may also include a sensor, such as an optical or light sensor (examples include, but are not limited to, a charge-coupled device and a photodiode), IR or RF sensor, or an audio sensor. As discussed further with respect to FIG. 2, the sensor may be used to detect an identification signal emitted by one of the other components in the environment 100. The identification signal may include identifying information associated with the component emitting the signal, such as a particular number, alphanumeric sequence, graphic, video sequence or a pattern. In alternative embodiments, the identification signal may include audio in place of, or in addition to, the foregoing.

In addition, multiple televisions 115(1)-115(4) may be located in the environment 100. As shown in FIG. 1, the televisions 115(1)-115(4) may all be located in multiple rooms 101(1)-101(4), or alternatively, in one room. The televisions 115(1)-115(4) may be connected to one or more set-top boxes 120(1)-120(2) that may be located in the same room as the television 115(1)-115(4) connected to the set-top box 120(1)-120(2), or alternatively, may be anywhere that permits communication with the set-top box, such as in a different room 101(1)-101(4). As discussed above, a single set-top box 120(1)-120(2) may be connected to multiple televisions 115(1)-115(4).

The components located in the environment 100 of FIG. 1 are provided for explanatory purposes only. Further, a computing system (not shown) may be located in the environment 100. The computing system may be in the same room or may be in a different room than the set-top boxes 120(1)-120(2) and may communicate to the set-top boxes 120(1)-120(2) through a network. The set-top boxes 120(1)-120(2) may further be connected to one or more of the components. These components may receive signals from the set-top boxes 120(1)-120(2) or send signals to the set-top boxes 120(1)-120(2). For instance, the televisions 115(1)-115(4) may receive video and/or audio signals, and the sound system may receive only audio signals.

II. Communications and Connections

Figure 2:
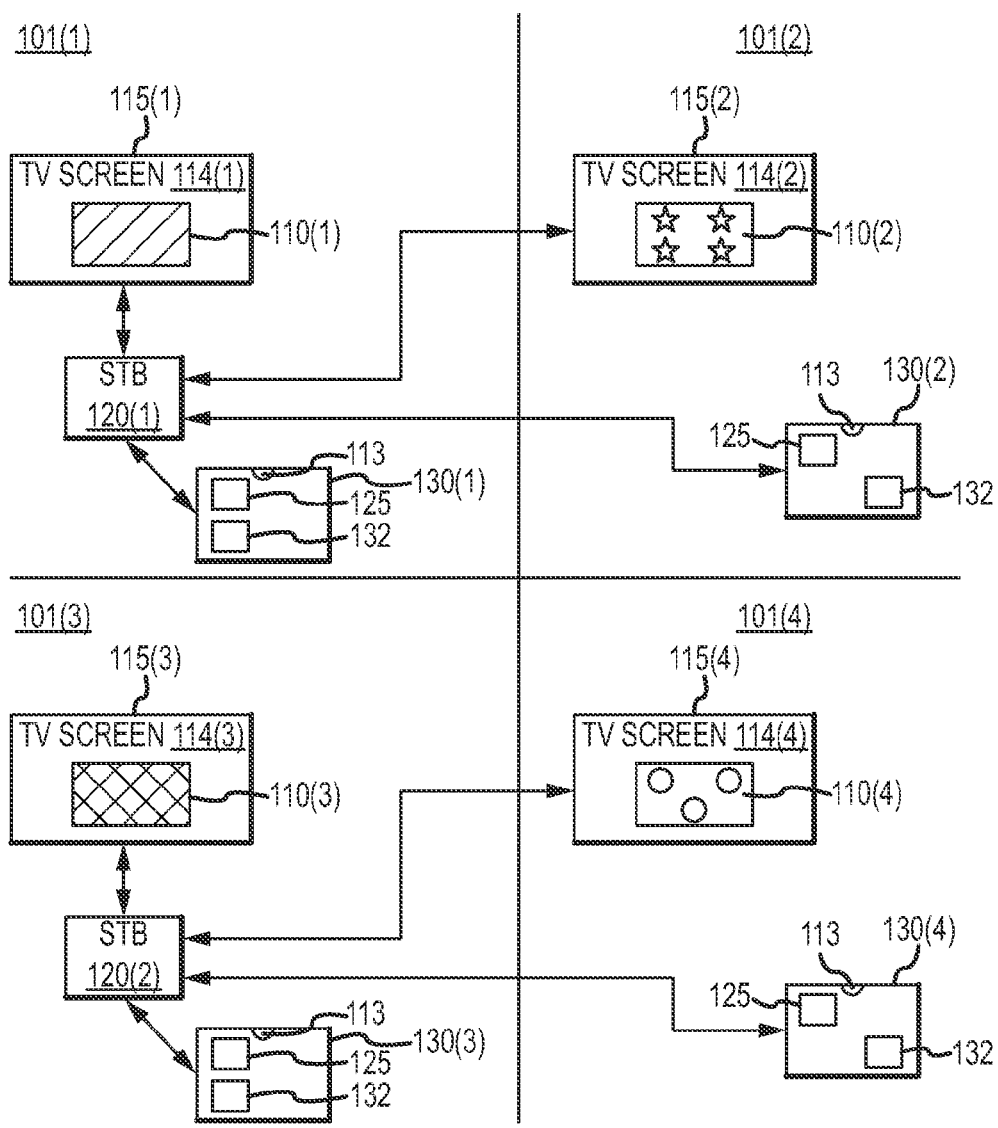
FIG. 2 depicts one embodiment of control devices and components, in accordance with the present disclosure.

In FIG. 2, the set-top boxes 120(1)-120(2) may be operationally, directly, indirectly, functionally or otherwise connected to the televisions 115(1)-115(4). Communications between the televisions 115(1)-115(4) and the set-top boxes 120(1)-120(2) may be unidirectional or bi-directional, where bi-directional communications are provided by the television display, and may be provided through various interfaces such as a high definition multimedia interface ("HDMI") cable, a co-axial cable, structured cable, Ethernet, wireless interface, combinations thereof and so on. In one example, the televisions 115(1)-115(4) may receive information for generating an identification signal 110 from the set-top boxes 120(1)-120(2). The identification signal 110 will be discussed in further detail below.

The set-top boxes 120(1)-120(2) may control the components of environment 100 wirelessly, through a wired connection, or through a combination thereof. The set-top boxes 120(1)-120(2) may also control the components resident in the environment 100 through remotes 130(1)-130(4), which will be discussed in further detail below. For example in FIGS. 1 and 2, the set-top boxes 120(1)-120(2) may communicate with the televisions 115(1)-115(4) and the remotes 130(1)-130(4). The set-top boxes 120(1)-120(2) may communicate with the televisions 115(1)-115(4) and the remotes 130(1)-130(4) through any type of interface as previously discussed. Such communication may be wired or wireless, across a network, or local. Furthermore, the communication between the set-top boxes 120(1)-120(2) and the remotes 130(1)-130(4) is generally wireless, although it may be possible to communicate between the set-top boxes 120(1)-

120(2) and the remote by establishing a wired connection between the two components. Moreover, it may be possible for the set-top boxes 120(1)-120(2) to communicate with the television 115(1)-115(4) and the remote 130 through any combination of wired and wireless connections.

The remotes 130(1)-130(4) may include selection buttons that correspond to and directly control individual components. For example, the remotes 130(1)-130(4) may include multiple selection buttons, including channel selection buttons, power on/off buttons, volume control buttons, etc. As will be discussed in more detail below, the remotes 130(1)-130(4) may also include a button, such as a "PAIR ME" button 125, for transmitting a command to the set-top boxes 120(1)-120(2) for generating an identification signal 110 on the televisions 115(1)-115(4)

III. The Identification Signal

The identification signal 110(1)-110(4) may be a unique identification code corresponding to the set-top box and, optionally, the associated television 115(1)-115(4) being engaged. The identification code may include any identifying information corresponding to a set-top box, such as a serial number, and may be unique to each set-top box in the environment 100. In one example, the identification signal, which may be a visual, audio, IR or RF signal, may be transmitted by all of the televisions that are connected to a set-top box initiating the identification signal and in the environment 100. Alternatively, the identification signal 110(1)-110(4) may only be transmitted by the televisions 115(1)-115(4) connected to the set-top box 120(1)-120(2) corresponding to the remote 130(1)-130(4) issuing the "PAIR ME" command, or by the television 115(1)-115(4) that is closest to the remote 130(1)-130(4) issuing the "PAIR ME" command. The unique identification code for each set-top box may be pre-loaded or downloaded onto the set-top boxes, and the identification signal 110 may include one or more screen images or sounds emitted by or displayed on the televisions 115(1)-115(4). The data for generating the identification signal 110(1)-110(4) may be provided to the televisions 115(1)-115(4) by the set-top boxes 120(1)-120(2) through a wireless or a physical connection, an IP connection, through a satellite signal, and so on.

In other examples, the identification signal 110 may be viewed on other components (not shown) in the environment 100, such as a computing system monitor that may be in the same room as the set-top box 120(1)-120(2), a monitor of a remote computing system, a cell phone screen, a personal digital assistant display or any other component that may be in communication with the set-top box 120(1)-120(2) through any type of connection or protocol including wired, IP connections, infrared signals, radio frequency signals, combinations of the foregoing, and so on. The identification signal 110 will be discussed in further detail below.

FIG. 2 depicts one embodiment of identification signals 110(1)-110(4), as displayed on multiple televisions 115(1)-115(4). As shown in FIG. 2, the identification signals may be displayed on a screen of a television. The signal may be displayed as a graphical overlay on the broadcast signal, or in other examples, may be the only signal displayed on the televisions.

As shown in FIG. 2, the identification signals 110(1)-110(4) may display a particular pattern. In other examples, the identification signals 110(1)-110(4) may take any form, and may be any graphical representation, including numbers or pictures, etc., that is detectable by the sensor of the remote 130. The identification signals 110(1)-110(4) may also include a flashing light, such as a graphical representation that is flashed in accordance with a pre-defined pattern. In addition, the identification signal 110(1)-110(4) may also be an audio signal that is detectable by an audio sensor of the remote 130(1)-130(4) or an IR or RF signal that is detectable by a suitable sensor of the remote 130(1)-130(4).

Each of the identification signals 110(1)-110(4) may be stored on a unique one of the set-top boxes 120(1)-120(2), such that each box stores only its own signal. Alternately, each set-top box may store multiple signals. Each set-top box generally includes a unique number that may be transmitted to the remote. (An identification signal may be, or may include, such a unique number.) In some embodiments, the identification signals 110(1)-110(4) may be downloaded via a network as needed, or sent from an individual component in the environment 110 or from a remote 130(1)-130(4) to the set-top boxes 120(1)-120(2) through a wired or wireless connection.

The remotes 130(1)-130(4) may each also include identifying information corresponding to the remotes 130(1)-130(4), such as a serial number, that may be unique to each remote 130(1)-130(4) in the environment 100. The identifying information for the remotes 130(1)-130(4) may be received by and stored in the set-top boxes 120(1)-120(2) in any of the foregoing manners, including those methods described above with respect to the identification signals 110(1)-110(4). In one example, the set-top boxes 120(1)-120(2) may be pre-programmed with the identifying information for the remotes 130(1)-130(4) to allow the set-top boxes 120(1)-120(2) to identify the individual remotes 130(1)-130(4) in the environment. In another example, the set-top boxes 120(1)-120(2) may receive the identifying information for the remotes 130(1)-130(4) via a satellite downlink, an Internet connection, a cable connection, a wireless connection, etc.

In one example, a set top box (and, in certain embodiments, an associated television) may be identified to, and thus associated with, a particular remote 130(1)-130(4) by pressing the "PAIR ME" button 125 on the remote 130(1)-130(4) and pointing the remote 130(1)-130(4) toward the screen of the television 115(1)-115(4). In response to the user pressing the "PAIR ME" button 125 on the remote 130(1)-130(4), the set-top box 120(1)-120(2) may process the command and issue a corresponding signal to the television 115(1)-115(4) to display a unique identification signal 110(1)-110(4). The sensor 113 on the remote 130(1)-130(4) may then receive the identification signal 110(1)-110(4), including the unique identification code for the set-top box and/or television 115(1)-115(4) being identified, and the remote 130(1)-130(4) may transmit a corresponding infrared or RF signal to the set-top box 120(1)-120(2) that includes information derived from the identification signal 110(1)-110(4). Alternatively, by pressing the "PAIR ME" button 125, the remote 130(1)-130(4) may initially transmit identifying information to the set-top box, thus permitting the remote to create the association instead of the set-top box.

Upon receiving the information derived from the identification signal 110(1)-110(4), the set-top box 120(1)-120(2) may associate the remote 130(1)-130(4) with the set-top box and/or television 115(1)-115(4). The association of the remote 130(1)-130(4) and the set-top box/television may be stored in a memory or other storage of the set-top box 120(1)-120(2), and transmitted to other connected set-top boxes 120(1)-120(2) in the environment 100. Accordingly, all of the set-top boxes 120(1)-120(2) in the environment 100 may be updated to recognize the association of the remote 130(1)-130(4) and the corresponding set-top box and/or television 115(1)-115(4).

Alternatively, the remote may recognize information contained in the identification signal, such as a make or model for a particular set-top box and/or associated television. The remote may reconfigure itself to emit commands recognizable by the set-top box and/or television upon such recognition.

The set-top box 120 may also determine which remote 130(1)-130(4) corresponded to the set-top box and/or television 115(1)-115(4) prior to transmission of the "PAIR ME" command, and may disassociate the set-top box and television from the prior remote. After dissociation of the set-top boxes from the prior remote, only the newly associated remote may control operation of the component(s). The memory may then be updated to delete the prior association and include the association of the remote issuing the "PAIR ME" command and the set-top box and/or television in question. Similarly, the set-top box 120 may also disassociate the remote 130(1)-130(4) issuing the "PAIR ME" command from the set-top box and/or television 115(1)-115(4) formerly associated therewith prior to transmission of the "PAIR ME" command, so that the remote 130(1)-130(4) no longer controls the functions of these components. It should be understood that the "PAIR ME" designation is one of convenience only; any input on the remote may be configured to perform the operations described herein. In some cases, the set-top box may not disassociate any remote from itself or any associated television, but instead allow multiple remotes to maintain such associations.

Figure 3:
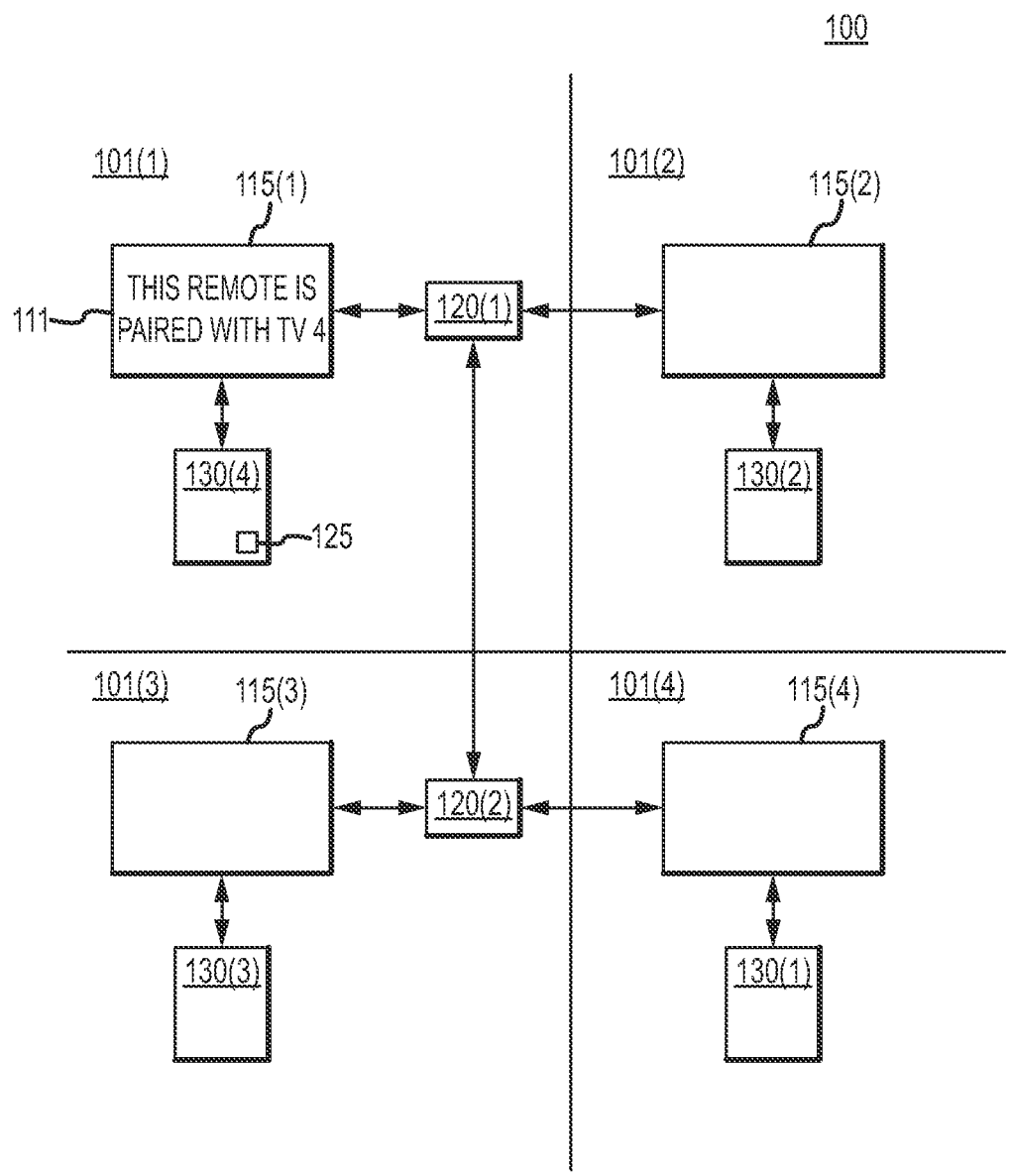
FIG. 3 depicts another embodiment of control devices and components, in accordance with the present disclosure.

FIG. 3 depicts another embodiment, which may also operate in environment 100, for allowing a user to identify a television or set-top box associated with a particular remote control. In this embodiment, pressing the "PAIR ME" button 125 does not reconfigure any of the remotes 130(1)-130(4) or set-top boxes 120(1)-120(2) in the environment, but instead causes the television 115(1) receiving the "PAIR ME" command to display information for identifying the set-top box (here, a television 115(4)) actually associated with the remote 130(4). Thus, in contrast to the example depicted in FIG. 2, the identification signal 111 identifies the television 115(4) that is actually associated with the remote 130(4), as opposed to the television 115(1) being engaged. The identification signal 111 may be such that the user may see the signal 111 and immediately identify the associated television 115(4). As illustrated in FIG. 3, the user may press the "PAIR ME" button, and the identification signal 111 may include a text overlay stating, "This remote is associated with TV number 4," thereby allowing the user to relocate any misplaced remotes 130(1)-130(4). In another example, the set-top box 120(1)-120(2) may be pre-programmed to include a function for allowing a user to identify the televisions 115(1)-115(4) in the environment 110 by their specific location in the household. For example, the identification signal 111 may state, "This remote is associated with the set-top box located in the kitchen" or "This remote is associated with the TV located in the basement," etc.

IV. Methods of Operation

Figure 4:
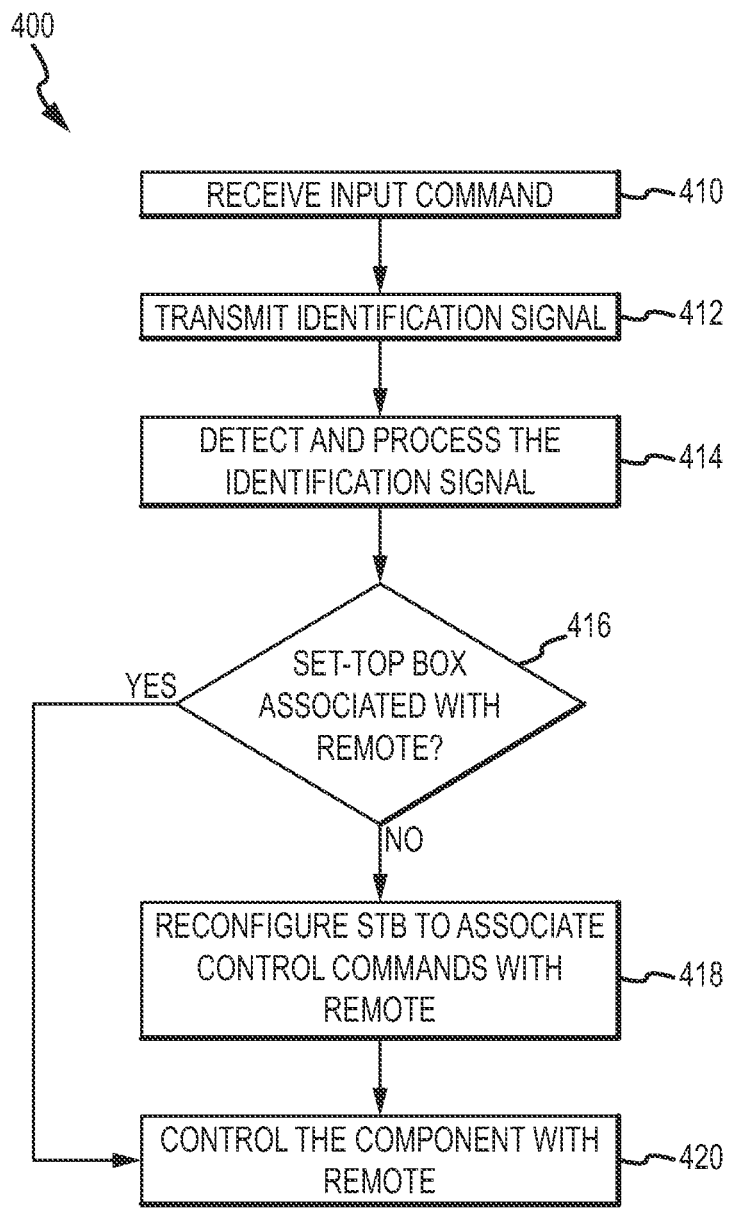
FIG. 4 is a flowchart depicting a method for associating a component with a control device using a component.

FIG. 4 is a flowchart depicting operations of an embodiment of a method 400 for associating and controlling a component with a remote. In the operation of block 410, a remote may receive a command input. The command input may be a user selecting any button, such as, but not limited to, a "PAIR ME" button, as described above. In the operation of block 412, the component may transmit an identification signal. After the user selects the "PAIR ME" button, the remote may transmit a command to the set-top box to transmit an identification signal. The identification signal may be an audio, visual, IR and/or RF signal emitted by a component. The identification signal may be emitted by multiple components associated with one or more set-top boxes, but only the remote issuing the "PAIR ME" command will acknowledge receipt of the identification signal.

In the operation of block 414, the identification signal may be detected by the remote. This may be accomplished, for example, using an audio, visual, IR and/or RF sensor. The set-top box or the remote may then determine, in the operation of block 416, whether the set-top box (and, optionally, component) is associated with the remote transmitting the "PAIR ME" command. As disclosed above, this may be accomplished by accessing a memory of the set-top box, where the look-up table stores the associations between the individual components and remotes.

The remote may already be in a mode associated with controlling the set-top box and/or component, and thus, in the operation of block 420, may not need to change pairing in order to control the set-top box and/or component. If, however, in the operation of block 416, the component or set-top box is not associated with the remote transmitting the "PAIR ME" command, then in the operation of block 418, the remote and/or the set-top box may be reconfigured to associate commands from the remote with that component and/or set-top box. As disclosed above, this may be accomplished by updating the look-up table stored in the memory of the set-top box. Additionally, this operation may further include reprogramming one or more buttons of the remote by associating the infrared code for controlling the paired component and/or set-top box with the buttons of the remote. Accordingly, data (such as control commands) may be transferred to the remote by the set-top box to permit the remote to control the component.

In the operation of block 420, the remote may send command signals to the component for controlling various functions of the component and/or set-top box, including changing the channels, changing the volume of the component and/or turning the component on and off.

Although the embodiments have been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

The invention claimed is:

1. An apparatus comprising:
    a receiving element operative to receive a pairing command wirelessly transmitted from a remote;
    control circuitry coupled to the receiving element and operative to process the pairing command received by the receiving element;
    a memory coupled to the control circuitry and operative to provide an identification code to the control circuitry in response to the control circuitry processing the pairing command, the identification code identifying at least the apparatus; and
    a transmitting element coupled to the control circuitry and operative to receive the identification code from the control circuitry and to transmit a signal including the identification code for display on a display device separate from the remote, the signal being configured to cause the remote to pair with at least one of the apparatus and the display device when displayed on the displayed device.

2. The apparatus of claim 1, wherein the identification signal includes information for identifying the display device.

3. The apparatus of claim 2, configured as a set-top box.

4. The apparatus of claim 3, wherein the memory is further operative to update an association between the remote and at least one of the set-top box and the display device.

5. The apparatus of claim 3, wherein the receiving element and transmitting elements are combined as a transceiver.

\* \* \* \* \*